Sept. 9, 1930.  O. LELLEP  1,775,313
PROCESS OF AND APPARATUS FOR BURNING CEMENT IN ROTARY KILNS
Filed March 22, 1928
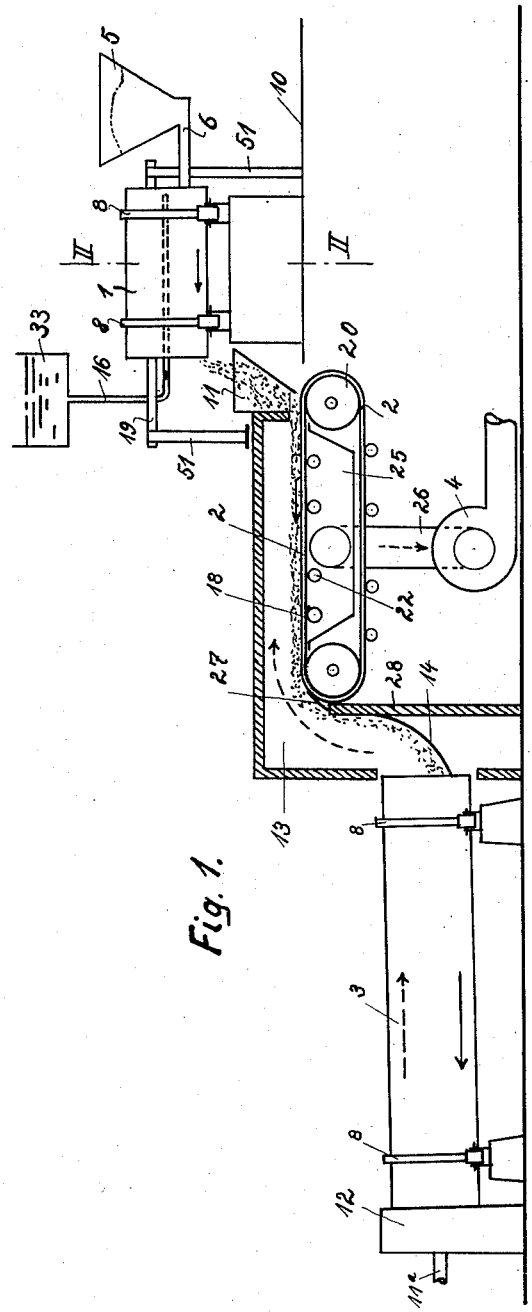
Fig. 1.
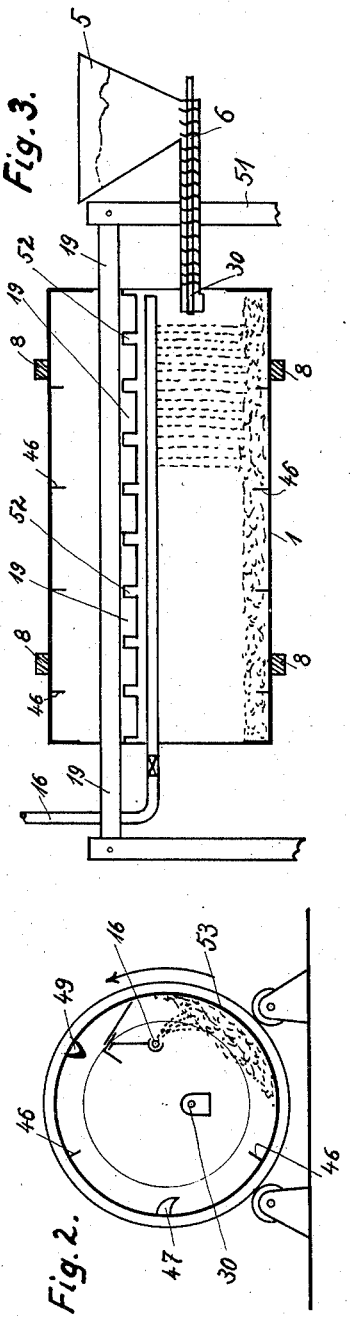
Fig. 3.
Fig. 2.
Otto Lellep,
Inventor Patented Sept. 9, 1930

1,775,313

UNITED STATES PATENT OFFICE

OTTO LELLEP, OF BERLIN, GERMANY

PROCESS OF AND APPARATUS FOR BURNING CEMENT IN ROTARY KILNS

Application filed March 22, 1928, Serial No. 263,823, and in Germany April 2, 1927.

For burning Portland cement and other hydraulic cements and lime-stones rotary kilns are now being used to a very large extent, the consumption of coal in this case amounting in practice to about 25 kg. for 100 kg. of cement. Of this quantity of fuel theoretically one quarter is consumed by the burning process, that is to say, the heat theoretically required to make 100 kg. of clinker will be contained in that quantity of heat which is developed by burning about 6 kg. of coal. The thermal efficiency of the rotary kiln therefore is very small and amounts only to about 25%. A shaft-kiln will produce an efficiency which is almost twice the efficiency of the rotary kiln as regards utilization of heat. A kiln of this kind, however, frequently does not furnish a clinker of high-grade quality. Besides, a shaft-kiln requires coke instead of coal and in addition to this its output is rather insufficient.

My present invention now has for its purpose to increase the thermal efficiency of the rotary kiln to such an extent that it will be equal or even better than that which may be obtained with a shaft-kiln and to maintain or even improve the quality of the clinker as well as the ability of the rotary kiln of being regulable. As regards its output and quality of material the rotary kiln is at the present time unsurpassed in practice.

The main heat-losses of a rotary kiln are due to the waste-gases which are of a temperature of about 900° C. This means that almost one half or at least one third of the entire heat contained in the fuel will be lost, through the chimney.

My present invention consists in a new process of and apparatus for utilizing the large quantities of waste heat which discharge from the kiln and for rendering said heat useful for the process of burning cement and lime-stone. The statements made herein regarding cement will essentially also hold true for lime-stone.

All devices for burning cement are based on the principle of transmitting as quickly and completely as possible the heat of the combustion gases to the charge. By careful experiments I have ascertained that there exists a definite dependency between the duration of the process of burning and the size of the granules of the charge. Balls of raw pulverized material have been placed into a kiln which had a temperature of 1500° C. and the time has been determined which is necessary for completely burning raw material of this shape. This time according to my experiments has been found for balls of a diameter of 100, 8 and 1 mm. to amount to 2 hours, 2 minutes and 2 seconds, respectively. This result shows quite clearly how the time of the process of burning may be diminished. In order to diminish the time which is required for the burning process, instead of the large briquettes only small granules of raw material with a proper diameter should be used. Theoretically this may be explained by the fact that in case of raw material in the form of small granules the surfaces which are able to receive the heat are far larger for a unit of weight of the raw material and that the heat in this case will have to pass through a far smaller thickness of material.

Another feature which is of quite considerable importance regarding transmission of heat from the gases to the solid bodies, is the velocity of the gases at the contact surfaces. This is of prime importance within those ranges of temperature which are below and at red heat, this being due to the fact that in this case the heat is transmitted mainly by convection and not by radiation.

Cement processes of the present day are faulty as far as the thickness of the layer of raw meal is concerned, as well as regards the efficiency of heat transmissions between the combustion gases and the material. In a rotary kiln the pulverized raw material is charged in the form of a layer of a thickness of about 30 cm, while in a shaft-kiln briquettes of raw material are used, said briquettes having about the size of a fist or of an egg. In consequence of this, several hours of time will be required for heating through the raw material, and especially in the rotary kiln a large part of the heat will discharge together with the waste-gases on account of the insufficient contact surface for the gases which carry the heat. The transmission of heat in this case will therefore be very imperfect.

My present invention contemplates an improved process for treating pulverized raw materials in the manufacture of cement and other products and also certain detailed improvements and construction of apparatus for producing the same.

According to my improved process, pulverized raw material is first agglomerated, hot waste-gases are caused to pass through such agglomerated material to dry and partially calcine the same and the agglomerated mass is then treated to a higher temperature or burned. The agglomeration of the raw material is accomplished by treating the same with a regulated quantity of water in the form of a spray or drops while the material is agitated, preferably in a rotating drum, the result being the formation of balls or granules of the raw material. The agglomerating drum may be considered as a first zone in which the raw material is treated. In applying the waste-gases to the agglomerated material the latter is caused to pass in a layer or mass through a chamber, or second zone, preferably being carried on a traveling grate, and the waste gases, by any suitable means, such as a suction fan, are caused to pass through the agglomerated material, which results in drying and calcining the same to a considerable extent in this zone. The waste-gases are preferably those coming from a rotary kiln. The agglomerated mass is next caused to pass into the rotary kiln or final zone where it is burned or sintered. As later noted, the complete process may sometimes be modified by eliminating the preliminary steps of agglomerating the material.

By using the raw material in the form of agglomerates of the size of a pea or larger, there will be provided an excellent contact between the material and the combustion gases and the heat receiving surfaces per kilogram of cement will be about 10 times larger than heretofore obtainable in a shaft-kiln and about 50 times larger than heretofore obtainable in a rotary kiln. In this manner according to my present invention a large heat receiving surface as well as a high velocity of the combustion gases will be obtained at this surface.

I accomplish the process of agglomeration in a simple apparatus. The raw meal is conveyed through a rotating drum and on its way through this drum water is sprayed upon the moving pulverized material. Each droplet of water forms a nodule or agglomerate of moistened powder. The quantity of water is regulated so that the output from the agglomerating drum will be in the form of balls or granules.

During the process of agglomeration it is sometimes difficult to prevent the formation of large lumps or balls of moistened material by reason of the fact that a layer of the charge in the agglomerating drum remains substantially immovable and is not sufficiently agitated by the rotation of the drum. This is especially true in the case of non-plastic materials which diffuse water rapidly, the water falling on such stationary layers preventing the formation of the small uniform ball-like lumps which are found most desirable in the subsequent treatment of the material. I therefore provide means for insuring agitation of the material in the drum during rotation of the latter. Such means may consist, for instance, of pins supported within the drum in staggered relation to each other and properly spaced. By means of these pins the stationary layer will be set in motion. Instead of pins also other devices such as prongs, knives or the like may be employed for this purpose. In order to keep the walls of the drum clean a scraper or equivalent contrivance is provided. If pins and a long scraper are used, the scraper will have to be provided with proper slots permitting passage of said pins in order to serve the purpose in view.

The accompanying drawings show in a diagrammatic view several constructional forms of the equipment according to my invention. In the drawings, Fig. 1 is a diagrammatic view of the agglomeration drum, of the traveling grate and of the rotary kiln constituting the whole essential equipment according to my invention, and Figs. 3 and 2 are a longitudinal and transverse section, respectively, through the agglomeration drum shown in Fig. 1.

Referring now more particularly to the drawing, it will be observed that the process and apparatus according to my invention are illustrated in the diagrammatic representation according to Fig. 1. The direction of motion of the raw material is indicated by full-drawn arrows, while the direction of motion of the gases is indicated by dotted arrows. The raw pulverized material is agglomerated in the drum 1 in a manner described further below. The granules of the raw material will fall automatically upon the moving grate 2, whence said granules will be carried into the shortened rotary kiln 3 by way of the incline 14. The combustion gases from the rotary kiln are drawn by a suction fan 4 through the layer of the granules of raw material. The raw material will be dried upon the moving grate, thereupon heated and the limestones partially dissociated. The rotary kiln in the present case will perform the calcining as well as the sintering process.

The relative quantity of the heat which is absorbed by the raw material on the moving grate and in the rotary kiln depends upon the length of the latter. Preferably the process is carried on in such a manner that the upper part of the layer of the granules falling from the grate into the rotary kiln is preliminarily heated below or almost to the sintering temperature, which amounts to about 1000 to 1400° C. The temperature of the under part of the layer during regular operation of the kiln should generally not exceed 550° C. in order to avoid premature destruction of the grate. In order to comply with these requirements, the rotary kiln may be constructed of a length which is only about one third of the length of rotary kilns used according to present practice.

The raw pulverized material is conveyed from the bin 5 by way of a conveyer worm 6 or other regulable conveying device into the granulating or agglomerating drum 1.

The agglomeration drum 1 and the rotary kiln 3 are rotatably mounted, for instance by means of the rings 8. The first and second floors of the building are designated with the reference numerals 9 and 10 respectively; 11$^a$ is the burner of the rotary kiln, and 12 the kiln hood. The kiln 3 and the grate 2 are connected with each other by means of a channel 13 which is made of a refractory material, an incline 14 being provided within said channel, said incline being likewise made of a refractory material. This incline 14 serves for conveying the material in pre-burnt condition into the kiln.

The burning process according to my invention requires an agglomerated raw material. The process of agglomeration should be simple and inexpensive in order to render it efficient and economical.

The most important details of the agglomeration drum are shown in Figs. 3 and 2 in longitudinal and transverse section respectively. Numerous experiments have shown that raw cement material may be agglomerated very conveniently and at small expense as before indicated by causing water to be added in droplets to the pulverized material which is movable within the drum. The raw meal is carried continuously through the feeding device 6 into the drum 1, while the water is added by means of the pipe 16. Care must therefore be taken that the pulverized material will be in lively motion during supplying water in the form of droplets thereto, for only in this case each droplet will form a wet granule of raw pulverized material. If the raw material is not kept in motion, the water collecting therein will form together with the raw material large wet lumps which for the present purpose are quite undesirable.

The size of the granules of raw material is dependent upon the size of the droplets of the water which is introduced into said material. The size of the droplets, on the other hand, will be determined by the size of the apertures in the pipe 16 through which said droplets pass. Apertures of about 0.7 mm. diameter at a water pressure of 0.6 m. will operate satisfactorily. In this case a thin continuous jet of water will flow out of said apertures, said jet of water decomposing into droplets which follow each other in rapid succession, this taking place at a distance of about 10 cm. from said pipe. In order to attain a uniform size of said granules it will be important that the droplets fall separately into the moving mass of raw material and are, as much as possible, of even size. Preferably the water pipe 16 is formed of very thin sheet metal so as to insure that the jets of water will be discharged from the pipe 16 in substantially parallel directions by the apertures in the pipe.

In addition to its upward and downward motion alongside the walls of the drum, the raw material also moves axially of the drum in the direction from the bin 5, which contains the raw pulverized material, to the bin 11 which contains the agglomerated material. This axial motion may be brought about by slightly inclining said drum in about a ratio of 1 to 100, or in some other desirable manner. On its path of motion the raw pulverized material will more and more receive water in form of droplets which will subsequently turn the raw material into agglomerates. A quantity of water will be required which amounts to about 10 to 12% of the raw material in order to practically transform the entire quantity of raw material into agglomerates. At first these granules are of irregular form and of weak structure and consequently very fragile. The continuous friction, however, which takes place between the agglomerates as well as between the agglomerates and the wall of the drum will cause said agglomerates to become rounded very soon and finally these granules will almost assume spherical shape, and their strength will gradually be considerably increased. The size of said agglomerates may vary from a diameter of several millimeters to about 20 mm. and more. The peripheral velocity of the drum may vary between 0.20 m. per second and that velocity at which the raw material will no more fall off the walls of the drum by reason of centrifugal force. The rotation of the drum requires a driving force which is about equal to the driving force necessary for a tube-mill. If 0.5 kilowatt-hours are used as driving energy, for each barrel (170 kg.) of cement, the agglomerates of the raw material will be sufficiently hard so that the greater part of said agglomerates will not break when freely falling from a height of two meters. The agglomerating process performed in the drum may be modified in various ways. If it is desired, for instance, to produce agglomerates of especial strength, the raw meal introduced through the screw conveyer 6 is overwetted into moist and sticky granules through the spray 16. Thereupon additional dry raw meal may be introduced through a special conveyer about into the middle of the drum. In this manner the moisture of the granules will again be reduced to a value of about 10% of the raw material. A process of this kind may not always be economical and in Fig. 1 therefore an apparatus is shown which performs the entire agglomerating process in a single operation. In this case the water spray extends about to a point positioned in the central part of the drum.

In order to avoid adhesion of the mass to the interior walls of the drum, scrapers 19, as shown in Fig. 2, may be used. Although it is possible to attain practically agglomerates which are entirely free of dust, the agglomerates sometimes leave the drum with about 8% non-agglomerated wet pulverized raw material. If this quantity of pulverized ray material should form an obstruction for the stream of gas on the moving grate, the dust as well as the smaller granules may be automatically separated by means of sieves and conveyed back to the feeding end of the drum by proper devices.

In order to save fuel the contents of water of the granules must be kept at a low value. On the other hand it will be difficult to obtain a good agglomeration with too little water. Practice has shown that satisfactory results may be obtained with a content of water amounting to from 8 to 16% of the dry mass of pulverized material.

A further important part of the apparatus according to my invention consists in the moving grate. This grate consists of the usual rollers 20, and of an endless chain which is carried slowly around said rollers. Instead of a travelling or chain-grate, however, also other appropriate devices may be used which are known in connection with automatic stokers for boilers and sintering apparatus for metallurgical purposes. Intermediate the end rollers the movable grate may be supported by smaller intermediate rollers 22. From the bin 11 the travelling grate will automatically be filled with the agglomerated raw material 18. Above and at its sides the grate is enclosed by the refractory walls of the channel or chamber 13. At the under side of the grate there is provided the suction chamber 25 which is connected by means of the pipe 26 to the suction fan 4, as shown in Fig. 1. The grate travels in a direction towards the kiln, while the combustion gases will penetrate into the agglomerated raw material thereon. This material which covers the grate in a thickness of about from 15 to 40 cm. will at the same time serve as a protection for the grate against the injurious action of the combustion gases. While the heat will pass through the raw material the moving grate will pass under the scraper 27, where the pre-burnt mass will be scraped from the grate and automatically fall into the kiln 3 past the refractory wall 28 and the incline 14.

The temperature of the gases in the suction chamber, as found by experiments, is very low. About two thirds of the length of the grate above the suction chamber—figured from the bin—will be at a temperature below the boiling point of water. The part of the grate which is positioned in proximity to the scraper 27 will be at some higher temperature, the latter, however, during continuous operation of the kiln will never reach red heat. It is possible to keep the average temperature of the waste-gases below 200° C., the upper layer of the granulated mass commencing under circumstances to undergo the process of sintering, while the temperature of the undermost part adjacent to the grate will not exceed 550° C. in proximity to the scraper 27. Under these conditions one half or more of the limestone in the raw material may be burnt to lime and these results clearly prove the favorable utilization of heat obtained according to my invention.

Instead of the induced draft as obtained by a suction fan also forced draft may be used.

The time during which the material is conveyed from the bin 11 into the rotary kiln amounts to about from 10 to 20 minutes, the vacuum in the suction chamber 25 at the same time amounting to from 10 to 20 cm. water column. These figures, however, should only be regarded as an example.

The rotary kiln, in which the final burning is accomplished according to the counter-current principle, differs from the heretofore used kilns of this kind only by the fact that its length may be reduced to approximately one third of the usual length.

By means of the apparatus and process herein described the consumption of coal may be reduced to about 15% of the weight of cement as compared with a consumption of 24% according to present practice. By properly utilizing heat in clinkers for the purpose of preheating the air (the devices serving for this purpose being known and therefore not shown in the drawing) and by means of a proper insulation of heat at the walls of the kiln, the consumption of coal may be further reduced to a value of about 13% of the weight of the clinker.

In accordance with the properties of the material to be worked in the kiln several devices which have been described herein may be modified or even omitted. Thus, for instance, for burning lime-stone or dolomite the agglomeration drum may be dispensed with, since the comminuted lime-stone may be brought immediately upon the moving grate.

In order to avoid balls, lumps or the like to be formed during the agglomerating process of the raw material which is contained in the drum 1, according to Fig. 11 pins 46 are provided at the interior surface of said drum, said pins 46 passing through the material to be agglomerated during rotation of said drum. By means of these pins the said material will be continuously agitated, thereby loosening the structure of said material and preventing a balling-up thereof. Instead of the pins 46 also prongs 47, or also blades 49 may be employed.

In order to keep the inside surface of the drum clean from undesirable coating a scraper or similar device 19 is provided within the drum 1. The scraper 50 may, for instance, be mounted upon fixed supports 51 outside of said drum 1. The scraper 19 is provided with proper slots 52 at the edge which is directed towards the interior of the drum 1, the pins 46 during rotation of the drum 1 passing through said slots 52.

I claim:—

1. A process for manufacturing cement which consists in forming the raw material into balls, forcing the waste gases of a kiln through a heat filter constituted by the material so formed to obtain efficient heat exchange between the waste gases and the material to partially calcine the material, and finally agitating and burning the material in the kiln.

2. A process of treating raw material in the manufacture of cement or similar products, which comprises subjecting pulverized material to a treatment by which it is agglomerated into ball-like lumps of relatively small size, collecting the lumps into a body and passing heated gas through the interstices of the body to dry and partially calcine the same while retaining the lumps against relative displacement in the body, and thereafter completing the heat treatment while agitating the lumps.

3. A process of treating raw material in the manufacture of cement and similar products which comprises depositing the material on a gas pervious support while the material is in the form of nodules and causing a current of hot gas to flow through the material and through the support, the temperature of the gas being sufficiently high to partially calcine the material and sufficiently low to avoid damage to the support, and thereafter transferring the material to a point in the current of gas at which the temperature of the gas is substantially higher to complete the heat treatment.

4. A process of treating raw material in the manufacture of cement and similar products which comprises continuously passing a hot gaseous stream from a single source of heat through two zones, one of said zones being adjacent the source of heat, depositing the material in a layer in agglomerated form in the other of the said zones and causing the gaseous stream to pass through the agglomerated material from the upper to the lower side of the layer to partially calcine the same, and thereafter removing the material to the zone adjacent the source of heat to complete the calcination.

5. A process of treating pulverized raw material in the manufacture of cement and similar products which consists in agglomerating the pulverized material in one zone, conveying the material into and through a second zone, causing heated gases to pass through a body comprising said agglomerated material while in said second zone to partially calcine the material, discharging the material into a third zone and burning the same therein, and causing the waste gases from said third zone to pass into said second zone and through the agglomerated material therein.

6. A process of treating raw material in the manufacture of cement or similar products which comprises depositing the material in a layer on a gas pervious support, causing a current of hot gas to flow from a source of heat through the said layer of material and support from the upper to the lower side thereof to partially calcine the material and to filter dust from the current of gas, and thereafter transferring the material to a point adjacent the source of heat to complete the calcination.

7. A process of making cement clinker which consists in agglomerating raw material, depositing said agglomerated material upon a movable and gas permeable support, passing waste gases from a burning chamber downwardly through said agglomerated material and said support to preburn the material, and thereafter passing said material into the burning chamber and burning the same finally therein.

8. In apparatus for making cement and similar products, the combination with a preburning chamber, of a gas permeable support within said chamber, a kiln arranged to receive the material from said support for causing the burning of the material, means whereby said material is delivered from the support to the kiln, and means for causing a current of hot gas to flow through said support and the material thereon to preburn the material.

9. Apparatus for making cement clinker which comprises means for agglomerating powdered cement, a preburning chamber, a gas permeable conveyor arranged to receive said agglomerated material and move the same continuously through said chamber, a kiln adapted to receive and complete the burning of the agglomerated material from said conveyor, and means for causing waste gases from the said kiln to pass into said preburning chamber and through the agglomerated material on the conveyor.

In testimony whereof I affix my signature.

OTTO LELLEP.